Figure 1:
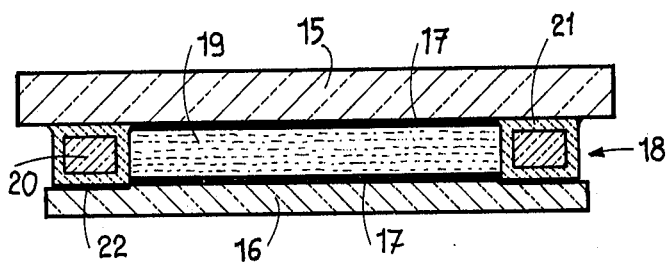

United States Patent [19]

Sallin et al.

[11] 4,308,442
[45] Dec. 29, 1981

[54] METHOD OF MANUFACTURING AN ELECTRO-OPTIC DISPLAY CELL AND CELL OBTAINED BY CARRYING OUT THIS METHOD

[75] Inventors: Michel Sallin, Neuchatel; Yves Ruedin, Saint-Blaise; Eric Saurer, Bevaix, all of Switzerland

[73] Assignee: Ebauches S.A., Neuchatel, Switzerland

[21] Appl. No.: 965,695

[22] Filed: Dec. 1, 1978

Related U.S. Application Data

[62] Division of Ser. No. 795,421, May 10, 1977, abandoned.

[30] Foreign Application Priority Data

May 5, 1977 [CH] Switzerland .......................... 5732/77

[51] Int. Cl.³ .......................... H05B 6/02; G02F 1/13
[52] U.S. Cl. .............................. 219/10.43; 219/10.53; 219/10.57; 219/10.49 R; 350/344; 29/592 R
[58] Field of Search ............... 219/10.41, 10.53, 10.57, 219/10.43, 10.49 R, 9.5; 350/339, 343, 344, 357, 362; 29/592, 595; 65/58, 43, 59 R, 59 B; 156/380, 272–273, 109

[56] References Cited

U.S. PATENT DOCUMENTS

| | | | |
|---|---|---|---|
| 2,775,676 | 12/1956 | Granberry et al. | 219/10.67 X |
| 3,862,830 | 1/1975 | Stern | 350/344 |
| 3,932,026 | 1/1976 | Sprokel | 350/339 |
| 3,953,700 | 4/1976 | Sindt | 219/10.53 X |
| 3,994,568 | 11/1976 | King et al. | 350/343 |
| 3,995,941 | 12/1976 | Nagahara et al. | 350/344 X |
| 4,050,786 | 9/1977 | Feldman | 350/344 |
| 4,158,485 | 6/1979 | Mueller et al. | 350/344 X |

*Primary Examiner*—Gene Z. Rubinson
*Assistant Examiner*—Philip H. Leung
*Attorney, Agent, or Firm*—Silverman, Cass & Singer, Ltd.

[57] ABSTRACT

An electro-optic passive display cell including two glass plates positioned spaced from each other with the edges thereof sealed and having an active constituent disposed between said plates. The plates are maintained in spaced and sealed relationship by a frame-shaped distance-piece adhered to the plates by a layer of glass paste solidified by sintering. The cell is formed by applying a high frequency induction current to fuse the frame-shaped piece to at least one plate.

7 Claims, 4 Drawing Figures

U.S. Patent        Dec. 29, 1981        4,308,442

METHOD OF MANUFACTURING AN ELECTRO-OPTIC DISPLAY CELL AND CELL OBTAINED BY CARRYING OUT THIS METHOD

This is a division, of application Ser. No. 795,421, filed May 10, 1977, now abandoned.

The present invention relates to a method of manufacturing an electro-optic display cell. The cell comprises an active constituent located in a space limited by a frame and by two plates. The frame is interposed between the plates, and the plates are tightly assembled to the frame.

The invention also relates to the electro-optic passive display cell obtained by carrying out this method.

The method according to the invention is characterized by the fact that the frame is made at least partially of a thermo-fusible material, that the said frame is provided with a metallic annular element in contact with the said fusible material, and that the said metallic annular element is heated by induction, by application of a high frequency current, so as to produce the fusing of the thermo-fusible material and, hence, the welding of the frame to at least one of the plates.

The drawing shows, by way of example, several embodiments of the invention.

FIGS. 1 to 4 are sectional views of four electro-optic passive display cells usable for instance in the watchmaking.

The cell represented in FIG. 1 comprises two glass plates 15 and 16 carrying electrodes diagrammatically represented at 17. These two plates are maintained spaced at a distance from each other by a frame, generally designated 18. Frame 18 and plates 15 and 16 form a space which is hermetically closed and in which there is located an active constituent 19, for instance a liquid crystal.

The frame 18 is constituted by an annular glass member 20 embedded in a thermo-fusible material 21, for instance sintered glass (glass-frit). A metallized layer 22 is interposed between the material 21 and the rear plate 16 of the cell.

The cell as disclosed and represented is obtained as follows:

The glass member 20 is coated with the material 21 and is secured to the front plate 15 of the cell by fusing the material 21, for instance by a passage through an oven.

The metallized layer 22 is applied on the rear plate 16 for instance by metallization under vacuum. One will use, for instance, a multilayer structure made of chromium, copper and gold. The layer 22 could also be realized by serigraphy.

The plate 15, provided with its frame 18, the frame being turned upwards, is provided with the active constituent 19. Then the plate 16, provided with the metallized layer 22, is applied on the frame.

The metallized layer 22 is then heated by induction, by means of a high frequency current of some megahertz frequency. This technique being known per se, it will not be disclosed here in detail. It will be merely mentioned that an electric conductor having the shape of a loop, the two ends of which are connected to a generator of high frequency current, will be placed around the cell, substantially at the height of the metallized layer 22, so that this layer be heated by induction. This metallized layer, constituting a heat vector, produces the refusion of the material 21, in the area adjacent to the said layer 22, so that the frame is thus welded to the rear plate 16 of the cell without the whole cell being subjected to a substantial heating and without, therefore, the active constituent 19 risking to be damaged.

It is to be noted that the electrodes 17 are practically not heated due to the fact that they are sufficiently resistive to this effect and that, moreover, they are discontinuous and not annular as is the metallized layer 22.

Figure 2:
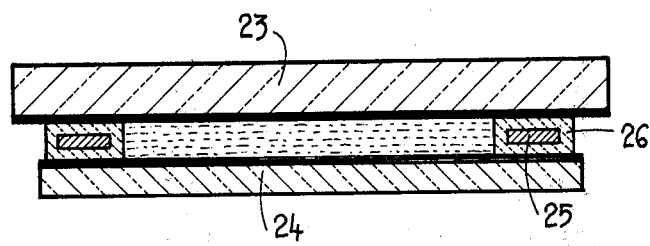

The cell of FIG. 2 comprises like that of FIG. 1, two glass plates 23 and 24 separated by a frame comprising a metallic annular member 25 embedded in a thermo-fusible material 26 similar to the material 21 of the embodiment of FIG. 1.

This cell is obtained as follows:

The metallic frame 25 is coated with the material 26 and is secured to plate 23 by fusion of this material 26, for instance by a passage through an oven.

The element thus realized is provided with the active constituent 19 and is assembled to the plate 24.

By application of a high frequency current, the metallic frame 25 is heated, resulting in a refusion of the material 26 producing the welding of the material 26 to the plate 24.

Figure 3:
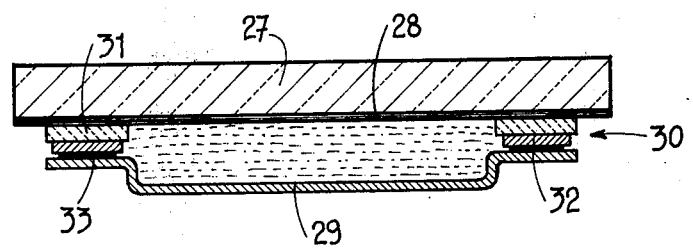

The cell of FIG. 3 comprises a glass plate 27 carrying an electrode 28 and a cap of plastic material 29 which has been metallized so as to constitute a counter-electrode. The plate 27 and the cap 29 are maintained spaced at a distance from each other by a frame, generally designated 30. Frame 30 comprises a layer of dielectric material 31 affixed in a known way (serigraphy or other) to the front plate 27, a metallic frame 32 having a good adherence with the dielectric material 31, and a layer of thermo-fusible solder 33 having a low fusing point, for instance an alloy of tin-lead, tin-silver, or tin-indium.

This cell is realized as in the two preceding examples, by the heating of the annular member 32 and of the solder 33, both metallic, by application of high frequency current, producing the fusion of the solder and, consequently, the welding of the cap 29 to the frame 30.

It is to be noted that the dielectric member 31 may be made of sintered glass. In this case, the high frequency current will be adjusted so that the temperature of fusion of the solder 33 is reached, which is of the order of 120° C., and not the temperature of fusion of the sintered glass, which is of the order of 550° C.

Figure 4:
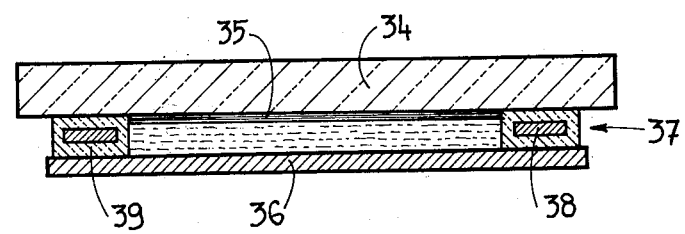

In the embodiment of FIG. 4, the cell comprises a front glass plate 34, carrying an electrode 35, and a rear metallic plate 36. The frame which separates them, generally designated 37, comprises a metallic core 38, as in the case of FIG. 2, embedded in a thermo-fusible material 39, for instance an ionomer such as the product "SURLYN"; trademark registered by Du Pont de Nemours. The assembly of these several elements will be effected as disclosed previously, for instance in the case of the embodiment of FIG. 2.

What we claim is:

1. A method of manufacturing an electro-optic display cell, the cell including a first plate and a second plate arranged spaced parallel one another, a frame interposed between the plates and spacing the plates apart to form a space therebetween, and an electro-optic display material contained in the space between the plates and frame, the frame including an annular part of thermo-fusible material and a metallic annular element in contact with said thermo-fusible material part, the method comprising:

welding the frame to the first plate by heating the frame and first plate to fuse the thermo-fusible material between the frame and first plate;

filling the space between the plates and frame with the electro-optic display material; and welding the second plate to the frame by heating the metallic member with an induced high frequency current to fuse the thermo-fusible material between the frame and the second plate.

2. The method as claimed in claim 1 which includes embedding the metallic annular element in the thermo-fusible material so that the metallic annular member forms a core of the frame.

3. The method as claimed in claim 1 in which the thermofusible material is glass-frit.

4. The method as claimed in claim 1 which includes affixing the thermo-fusible material part of the frame to one of said plates, securing this part on said one plate by fusing the said material, applying a metallic layer on one of the thermo-fusible material part and second plate, this metallic layer forming said metallic annular element of the frame, assembling the said thermofusible material part with the said second plate, and heating said metallic layer by inducing therein a high frequency current which produces a refusion of the thermo-fusible material and, hence, the welding of the frame to the second plate.

5. The method as claimed in claim 1 which includes affixing a dielectric material annular element to one of said plates, affixing a metallic layer to said dielectric material annular element, affixing a layer of thermo-fusible solder to said metallic layer, said metallic layer forming said metallic annular element of the frame and said layer of thermo-fusible solder forming said thermo-fusible material part of the frame, assembling said thermo-fusible part of the frame with the second plate, and heating the metallic layer and the layer of solder by inducing in said metallic layer a high frequency current, which produces the fusing of the solder and, hence, the welding of the said whole element to the second plate.

6. The method as claimed in claim 1 which includes using as the annular metallic element of the frame an annular metallic member having two axial faces, affixing a thermo-fusible material on said two axial faces, securing the annular metallic element with the thermo-fusible material on said two faces to one of said plates by fusing the said thermo-fusible material on one face thereto, assembling the other one face of thermo-fusible material with the second plate and heating the metallic annular member by inducing therein a high frequency current, which produces a refusion of the thermo-fusible material and, hence, the welding of the said whole element to the second plate.

7. The method as claimed in claim 1 wherein an ionomer is used as the thermo-fusible material.

* * * * *